UNITED STATES PATENT OFFICE.

DOUGLAS FRANK TWISS, OF BIRMINGHAM, ENGLAND, ASSIGNOR TO THE DUNLOP RUBBER COMPANY, LIMITED, OF BIRMINGHAM, ENGLAND.

METHOD OF RECLAIMING RUBBER.

1,335,926.  Specification of Letters Patent.  Patented Apr. 6, 1920.

No Drawing.  Application filed December 6, 1918. Serial No. 265,651.

*To all whom it may concern:*

Be it known that I, DOUGLAS FRANK TWISS, a subject of the King of Great Britain, residing at Para Mills, Aston Cross, Birmingham, in the county of Warwick, England, have invented certain new and useful Improvements in Methods of Reclaiming Rubber, of which the following is a specification.

When unvulcanized rubber is mixed with a small percentage of sulfur and heated the sulfur gradually passes from the free condition into a state of combination with the rubber and the rubber gradually becomes vulcanized. By prolonging the period of heating practically the whole of the sulfur may be combined with the rubber but in vulcanized rubber as used commercially there is generally an appreciable proportion of the sulfur which remains in an uncombined or free state.

Heretofore when it has been designed to regenerate or reclaim vulcanized rubber attempts have sometimes been made to remove this residual free sulfur by finely dividing the rubber and treating the comminuted rubber with solutions of alkalis or sulfites or other suitable chemical substances and subsequently mixing it with oil, or by dissolving the vulcanized rubber by means of a suitable solvent and then recovering the dissolved rubber. In other cases no attempt has been made to remove the free sulfur but the comminuted rubber has been mixed with oil and heated by steam under pressure, the combined effect of the oil and heat producing a degree of softness which will allow the rubber to be manipulated as ordinary unvulcanized rubber. Or the material has been heated by superheated steam under pressure or subjected to pneumatic or mechanical pressure while heated in a vessel in the absence of air so as to produce a homogeneous mass.

According to this invention the rubber, cut or otherwise divided into pieces of suitable size, is heated without pressure and in a loose form in a chamber from which air is expelled by the aid of steam introduced into the chamber.

The necessary heat is applied preferably by such means as enables uniformity of temperature and uniform distribution of the heat throughout the chamber to be maintained during the time occupied in regenerating the rubber. The air may be expelled by injecting steam, under pressure slightly in excess of that of the external atmosphere, into the chamber by the aid of suitable inlet and outlet ports, valves and connections but such steam is not employed as the heating agent. Heat may be applied by an electric or a gas heater, but preferably heavy oil having a high boiling point is used in a suitable oil jacket in which the oil is maintained at the required temperature and circulated either by its natural convection currents or by means of a pump working outside the jacket and connected therewith.

The temperature to be maintained in the chamber depends upon the nature of the rubber to be reclaimed and the time occupied in carrying out the process, but for the devulcanization of rubber such as is used in the manufacture of solid rubber tires, a uniform temperature of approximately 280° C. in the interior of the chamber is preferred and consequently the temperature of the oil contained in the jacket is raised to a few degrees above 280° C. These temperatures may, however, be raised or reduced when it is desired to shorten or extend the period of heating and also when the particular rubber to be reclaimed requires the application of greater or less heat.

The improved process is especially applicable to the devulcanization of rubber which in comparison with vulcanite is soft and which is free from cotton fabric. It will, however, be readily understood that the improved method may be used for the reclaiming of rubber to which oil, alkalis or acids are, or have been, applied (either for the purpose of removing the free sulfur or destroying the fabric) and that the increased temperature obtainable will greatly facilitate the process of reclaiming.

The reclaimed rubber is cooled, preferably as far as possible in the absence of air, and when cooled it may be passed between rolls to form sheet rubber or it may be manipulated in any other desired manner.

What I claim and desire to secure by Letters Patent of the United States is:—

1. The process for the regeneration of vulcanized rubber which consists in dividing the rubber into pieces, placing it loosely in a chamber, removing the air from the said chamber by the introduction of steam and after removal of the air heating the rubber to a uniform temperature while in a loose condition in the chamber in the presence of the residual steam.

2. The process for the regeneration of vulcanized rubber which consists in dividing the rubber into pieces, placing it loosely in a chamber, removing the air from the said chamber by the introduction of steam and after removal of the air heating the rubber while in a loose condition in the chamber to about 280° C. in the presence of the residual steam.

3. The process for the regeneration of vulcanized rubber which consists in dividing the rubber into pieces, placing it loosely in a chamber, expelling the air from the said chamber by the injection of steam under pressure and heating the rubber while in a loose condition in the chamber by an externally applied source of heat.

4. The process for the regeneration of vulcanized rubber which consists in dividing the rubber into pieces, placing it loosely in a chamber provided with an oil jacket, removing the air from the said chamber and after removal of the air heating the rubber while in a loose condition by circulating heated oil of high boiling point through the oil jacket so as to produce a uniform temperature throughout the chamber.

DOUGLAS FRANK TWISS.